Figure 1:
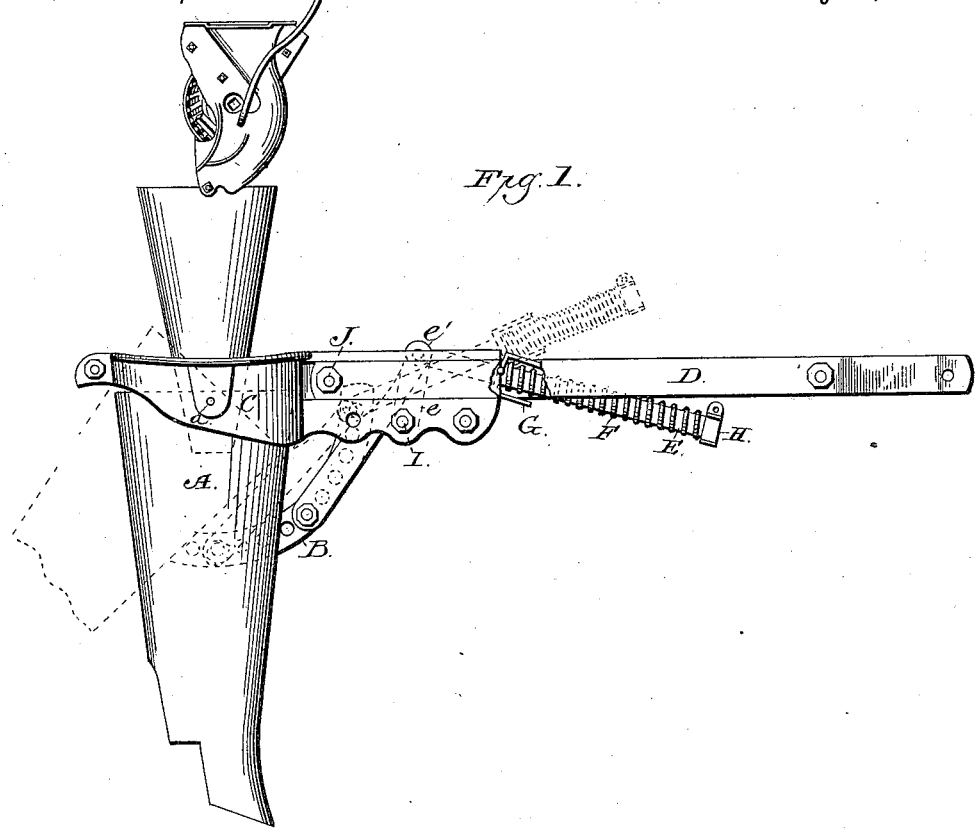

(Model.)

E. D. MEAD.
HOE FOR GRAIN DRILLS.

No. 280,496. Patented July 3, 1883.

Attest:
Geo. H. Preston
G. Van Sickle

Inventor
Edwin D. Mead

UNITED STATES PATENT OFFICE.

EDWIN D. MEAD, OF SHORTSVILLE, NEW YORK.

HOE FOR GRAIN-DRILLS.

SPECIFICATION forming part of Letters Patent No. 280,496, dated July 3, 1883.

Application filed November 25, 1882. (Model.)

*To all whom it may concern:*

Be it known that I, EDWIN D. MEAD, a citizen of the United States, residing at Shortsville, in the county of Ontario, State of New York, have invented certain new and useful Improvements in Hoes or Teeth for Grain-Drills; and I do hereby declare that the following is a full, clear, and exact description of the invention, which will enable others skilled in the art to which it appertains to make and use the same.

The object of my invention is, first, to hang the hoe of a grain-drill in such a way that when it is thrown back and up by running against an obstacle in the ground it will not cramp and break the conductors; second, to provide a device that is easily converted into an improved spring-hoe.

In order to carry my invention into effect, I first provide the hoe, on each side and at the top, with pivots, and a curved arm in front, with a series of holes in it describing a circle around the pivots. The draw-bars are then connected with the hoe by these pivots, and the arm passes up between the draw-bars to receive the pin, or is secured in its place by the spring arrangement hereinafter described; or, instead of the draw-bars reaching back to the pivots, a band is made and pivoted to the hoes and fastened to the draw-bars, as shown in the drawings. After the hoe is hung in the draw-bars, to keep it from swinging on the pivots, a wooden pin is put in one of the holes in the arm and made to rest on top of the draw-bars, or is put through holes in the bands. The object in having a wooden pin is to have something that will break when the hoe strikes anything fast in the ground, so that it can turn back on the pivots and save breakage in the iron-work; or, instead of the pin, a spring device can be used, as hereinafter shown.

Figure 3:
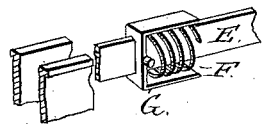
Figure 2:
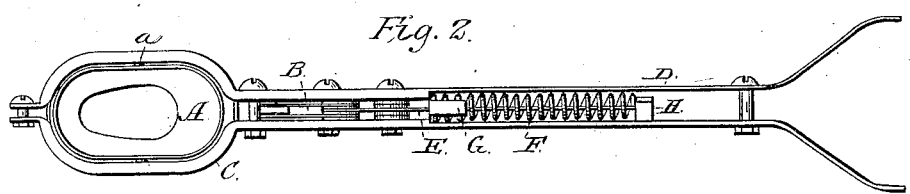

Figure 1 is a side view. Fig. 2 is a plan view. Fig. 3 is a detail view, partly in section.

A is the hoe proper, pivoted at *a*. B is the arm, with holes describing a circle around the pivot *a*. C are the bands in which it is pivoted. D are the draw-bars. E is a chain or bar having an intersecting link, *e*, pivoted to it at the joint *e'*. F is the spring. G is a movable pivot-socket for the end of the spring to rest in. H is a fixed socket fastened on the end of the chain to hold the other end of the spring. The intersecting link swings on the pivot I. J is the usual place where other hoes are pivoted to the draw-bars.

It will be seen that by drawing a circle from the back part of the hoe upward around the point J nearly the whole width of the hoe is thrown above the draw-bar, and also forward, which changes its relative position to the distributer above so much that it cramps and often destroys the conductors; but when pivoted at *a* its relative position is changed but little, and therefore overcomes this one great difficulty. To convert it into a spring-hoe, the intersecting link *e* of the chain E is pivoted at the point I, and the lower link of the chain fastened to the arm B. The upper link passes through the pivot-socket G and the spring F, and has fastened on the end of it the socket H, to hold and operate the spring. It will be seen that the points B, *e'*, and I are set together in such a shape that they form a lock between the lower link and intersecting link sufficient, in combination with the upper link and spring, to hold the usual strain on the lower point of the hoe when in operation; but if the point strikes anything solid in the ground the lock yields and lets the point back and over the obstacle. It will be seen, also, that the pivot-socket adjusts itself to the motion of the link when it is passing through and gives it a free movement.

I am aware that the combination of the lower link with the intersecting link is in use in spring-hoes. My improvement consists in adding to the lower link, at the point of the intersecting link, another link or links, which passes through a pivoted socket and through the coiled spring, and has fastened on the end of it a socket, between which and the pivoted socket the spring is held, and made to act directly upon the hoe, when it is turned back, to bring it to its place again. It also consists in pivoting the hoe directly to the draw-bars by side pivots.

What I desire to claim and secure by Letters Patent is—

1. In combination with a hoe pivoted to the draw-bars on its sides, a chain having one end of a link pivoted to the hoe in front and below the draw-bars, and the other end pivoted to an intersecting link and a continuing link or links, the intersecting link being also pivoted to the draw-bars, and the continuing link or links passing through a pivoted socket and through the coiled spring, for the purpose specified.

2. In a spring-hoe, the combination of the chain having an intersecting link with the pivoted socket and spring, for the purpose specified.

EDWIN D. MEAD.

Witnesses:
A. B. BISSEL,
N. K. COLE.